(12) United States Patent
Peng

(10) Patent No.: US 10,249,326 B1
(45) Date of Patent: Apr. 2, 2019

(54) HEAT-ASSISTED MAGNETIC RECORDING HEAD INCLUDING A WAVEGUIDE WITH DIELECTRIC CAVITY TO REDUCE OPTICAL FEEDBACK

(71) Applicant: Seagate Technology LLC, Cupertino, CA (US)

(72) Inventor: Chubing Peng, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/873,114

(22) Filed: Jan. 17, 2018

Related U.S. Application Data

(60) Provisional application No. 62/474,714, filed on Mar. 22, 2017.

(51) Int. Cl.
| | | |
|---|---|---|
| *G11B 11/00* | (2006.01) | |
| *G11B 5/012* | (2006.01) | |
| *G11B 13/08* | (2006.01) | |
| *G11B 5/00* | (2006.01) | |
| *G11B 5/60* | (2006.01) | |

(52) U.S. Cl.
CPC ............ *G11B 5/012* (2013.01); *G11B 13/08* (2013.01); *G11B 5/6088* (2013.01); *G11B 2005/0021* (2013.01)

(58) Field of Classification Search
None
See application file for complete search history.

(56) References Cited

U.S. PATENT DOCUMENTS

| 8,675,455 | B1 | 3/2014 | Krichevsky et al. | |
|---|---|---|---|---|
| 9,001,629 | B1 | 4/2015 | Yuan et al. | |
| 9,484,051 | B1* | 11/2016 | Krichevsky | G11B 5/3133 |
| | | | | 369/13.33 |
| 9,558,769 | B1* | 1/2017 | Kim | G11B 5/314 |
| | | | | 369/13.33 |
| 9,679,594 | B1* | 6/2017 | Peng | G11B 5/4866 |
| | | | | 369/13.33 |
| 2007/0242921 | A1* | 10/2007 | Matsumoto | G01Q 60/22 |
| | | | | 369/13.33 |
| 2011/0216635 | A1* | 9/2011 | Matsumoto | G11B 5/105 |
| | | | | 369/13.33 |
| 2014/0241137 | A1* | 8/2014 | Jin | G11B 5/4866 |
| | | | | 369/13.14 |
| 2015/0131415 | A1* | 5/2015 | Peng | G11B 5/1278 |
| | | | | 369/13.32 |
| 2015/0279394 | A1* | 10/2015 | Peng | G02B 6/14 |
| | | | | 369/13.33 |
| 2015/0295384 | A1* | 10/2015 | Tatah | H01S 5/0064 |
| | | | | 369/13.33 |
| 2015/0325261 | A1* | 11/2015 | Yang | G11B 5/3133 |
| | | | | 369/13.33 |
| 2017/0249962 | A1* | 8/2017 | Peng | G11B 5/4866 |
| | | | | 369/13.33 |

* cited by examiner

*Primary Examiner* — Tan X Dinh
(74) *Attorney, Agent, or Firm* — Hollingsworth Davis, LLC

(57) ABSTRACT

A recording head has a near-field transducer proximate a media-facing surface of the recording head. A waveguide core overlaps and delivers light from a light source to the near-field transducer. The waveguide core has a dielectric cavity proximate the near-field transducer. The cavity is filled with a cladding material and reduces optical feedback to the light source.

20 Claims, 12 Drawing Sheets

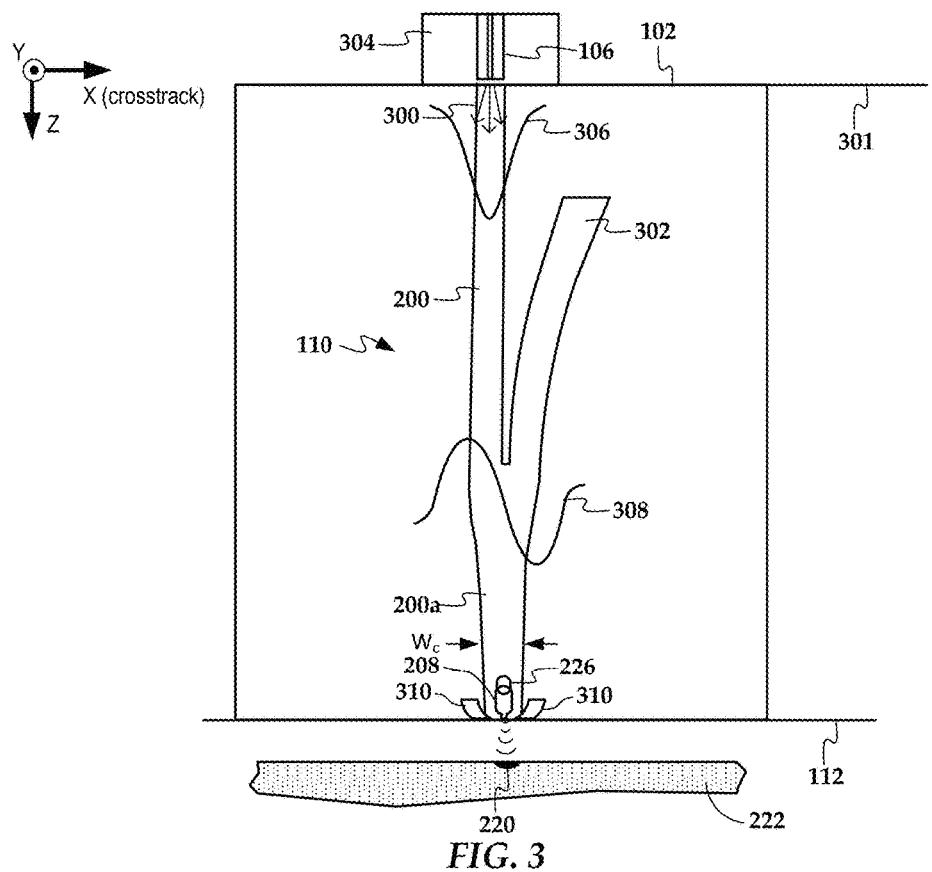
*FIG. 3*
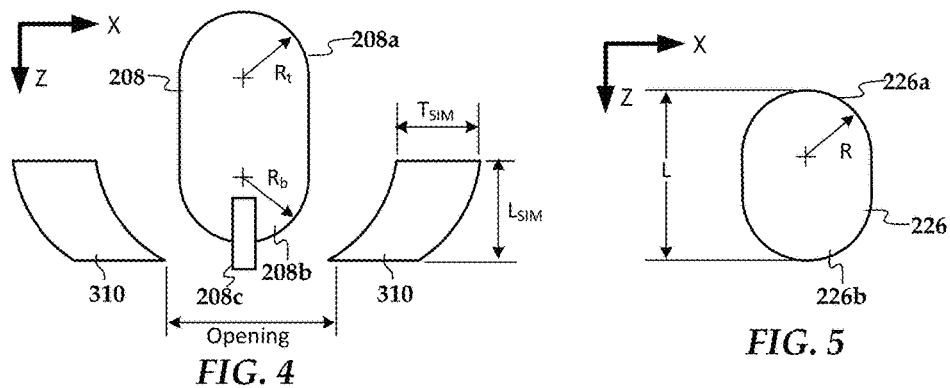
*FIG. 4*  *FIG. 5*

US 10,249,326 B1

HEAT-ASSISTED MAGNETIC RECORDING HEAD INCLUDING A WAVEGUIDE WITH DIELECTRIC CAVITY TO REDUCE OPTICAL FEEDBACK

RELATED PATENT DOCUMENTS

This application claims the benefit of Provisional Patent Application No. 62/474,714 filed on Mar. 22, 2017, which is incorporated herein by reference in its entirety.

SUMMARY

The present disclosure is directed to a waveguide core with a cavity to reduce optical feedback. In one embodiment, a recording head has a near-field transducer proximate a media-facing surface of the recording head. A waveguide core overlaps and delivers light from a light source to the near-field transducer in a light propagation direction. The waveguide core has a dielectric cavity proximate the near-field transducer. The dielectric cavity has a length along the light propagation direction such that light will propagate through the dielectric cavity. The dielectric cavity is filled with a cladding material and reduces optical feedback to the light source.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

FIG. 3 is a wafer plane view of a slider according to an example embodiment;

FIG. 4 is a close up view of the near-field transducer shown in FIGS. 2 and 3;

FIG. 5 is a close-up view of the cavity shown in FIGS. 2 and 3;

DETAILED DESCRIPTION

Figure 1:
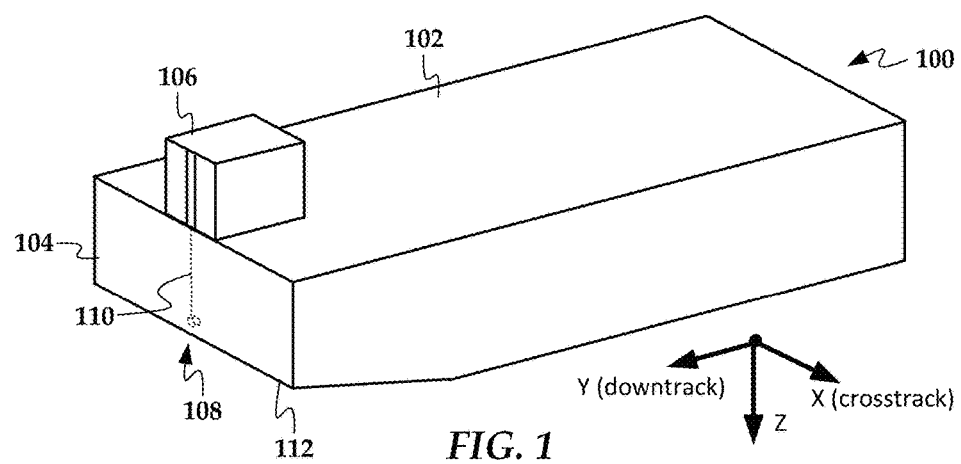
FIG. 1 is a perspective view of a slider assembly according to an example embodiment.

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, a source of optical energy (e.g., a laser diode) is integrated with a recording head and couples optical energy to a waveguide or other light transmission path. The waveguide delivers the optical energy to a near-field transducer (NFT). The NFT concentrates the optical energy into a tiny optical spot in a recording layer, which raises the media temperature locally, reducing the writing magnetic field required for high-density recording.

The laser diode used in a HAMR recording head is an open resonator, for instance, an edge-emitting laser diode. This type of device can be de-stabilized by returning light into the diode cavity, sometimes referred to as optical feedback or back reflection. Optical feedback may cause laser instability, which behaves as optical output jump and dynamic intensity noise, resulting in magnetic transition sudden jump and jitters. Embodiments are described below that can reduce or eliminate optical feedback.

One way to reduce optical feedback is to use a reflector to cancel the reflection from the NFT, the magnetic writer, and the recording media by interferometric method. There are many types of reflectors, such as a metallic cylinder in the bottom cladding layer, a distributed Bragg grating (DBR) at the core/cladding interface, and a waveguide splitter with one end terminated with a reflector. More details of a reflector are described in U.S. Pat. No. 9,679,594 filed on Jun. 29, 2016. Effectiveness and impact on the recording performance of such reflectors depend on the reflector and NFT.

Another way to reduce optical feedback is to use a subwavelength solid immersion (SIM) optical side shield to improve the NFT performance (e.g., efficiency, thermal gradient, etc.) significantly. The SIM side shield recycles some of optical energy that is not coupled into the NFT, transferring it into the longitudinal electric field. This boosts the NFT efficiency and therefore, enhances the thermal gradient with low increase in the NFT temperature. This design also yields low feedback (to 1-2%) at an optimal SIM length. But it is still desired to reduce the feedback to nearly zero or below 0.1%. The metallic cylinder reflector described above is able to nullify the feedback but with large laser diode power penalty, e.g., a ~30% increase in laser output power needed to write a magnetic track. Some other methods to reduce optical feedback, such as a step at the waveguide core, although having low laser diode power penalty, are not as effective in eliminating the feedback. In embodiments described below, a dielectric cavity in the waveguide core is used to reduce optical feedback with minimal penalty in NFT recording performance. Such a cavity may be used with or without an optical side shield SIM.

In reference now to FIG. 1, a perspective view shows a read/write head 100 according to an example embodiment. The read/write head 100 may be used in a magnetic data storage device, e.g., HAMR hard disk drive. The read/write head 100 may also be referred to herein interchangeably as a slider, head, write head, read head, recording head, etc. The read/write head 100 has a slider body 102 with read/write transducers 108 at a trailing edge 104 that are held proximate to a surface of a magnetic recording medium (not shown), e.g., a magnetic disk.

The illustrated read/write head 100 is configured as a HAMR device, and so includes additional components that form a hot spot on the recording medium near the read/write transducers 108. These HAMR components include an energy source 106 (e.g., laser diode) and a waveguide 110. The waveguide 110 delivers electromagnetic energy from the energy source 106 to a near-field transducer (NFT) that is part of the read/write transducers 108. The NFT achieves surface plasmon resonance and directs the energy out of a media-facing surface 112 to create a small hot spot in the recording medium.

Figure 2:
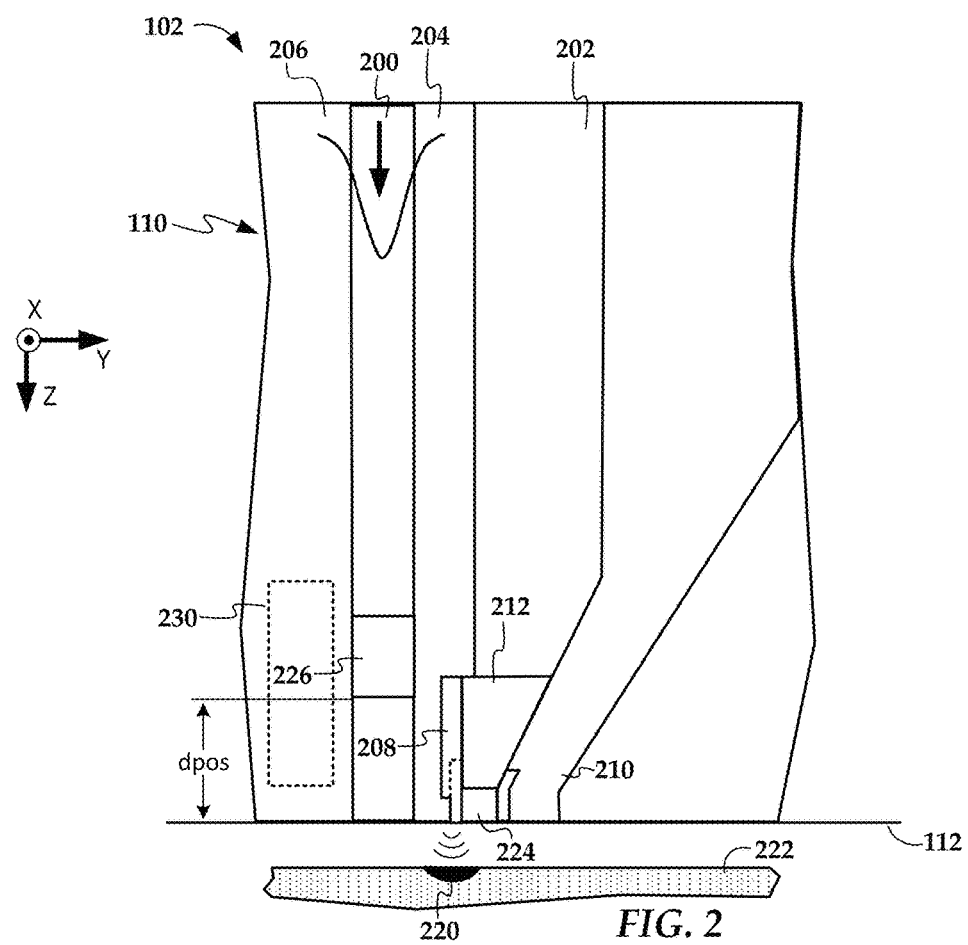
FIG. 2 is a cross-sectional view of a slider along a down-track plane according to according to an example embodiment.

In FIGS. 2 and 3, cross-sectional views show details of a slider body 102 according to an example embodiment. As best seen in FIG. 2, the waveguide 110 includes a core 200, top cladding layer 202, side cladding layer 204, and bottom cladding 206. As seen in FIG. 3, a waveguide input coupler 300 at a top surface 301 of the slider body 102 couples light from the light source 106 to the waveguide 110, the light source 106 being mounted to the slider body 102 via a submount 304. The waveguide input coupler 300 receives light from the light source 106 and transfers the light to the core 200. As it extends away from the light source 106, the core 200 tapers from narrower to wider width (width in this case is the core's x-dimension). The waveguide core 200 is made of dielectric materials of high index of refraction, for instance, AlN (aluminum nitride), $Ta_2O_5$ (tantalum oxide), $TiO_2$ (titanium oxide), $Nb_2O_5$ (niobium oxide), $Si_3N_4$ (silicon nitride), SiC (silicon carbon), $Y_2O_3$ (yttrium oxide), ZnSe (zinc selenide), ZnS (zinc sulfide), ZnTe (zinc telluride), $Ba_4Ti_3O_{12}$ (barium titanate), GaP (gallium phosphide), $CuO_2$ (copper oxide), and Si (silicon).

A branch waveguide 302 splits off of the main core 200 and converts the fundamental transverse electric waveguide mode ($TE_{00}$), as indicated by mode profile 306, to a first-higher-order transverse electric mode ($TE_{10}$), as indicated by mode profile 308. The NFT 208 is designed for $TE_{10}$) coupling. Side shields 310 (e.g., parabolic shields) recycle some of optical energy that is not coupled into the NFT 208, transferring it into the longitudinal electric field, boosting the NFT efficiency and therefore, enhancing the thermal gradient. With a narrow opening (for instance, below 200 nm; see FIG. 4) in the side shields 310, thermal background (caused by, for instance, excitation $TE_{10}$) mode, NFT-induced transverse magnetic mode, $TM_{00}$) in a storage media is also reduced, further increasing the thermal gradient. The materials and geometry of the side shields 310 can vary to improve reliability, as discussed below. As seen in the detail view of FIG. 4, The NFT 208 has a stadium-shaped, enlarged portion with two curved ends 208a-b. A peg 208c protrudes from the enlarged portion. In other configurations, one or both of the ends 208a-b of the enlarged portion may be flattened or pointed.

In reference again to FIG. 2, the NFT 208 is placed at the side and top cladding layers 204, 202 of the waveguide and near the waveguide core 200. A dielectric spacer 224 is located between the NFT 208 and the write pole 210. The cladding layers 202, 204, 206 are each formed of a dielectric material having a refractive index lower than the core 200. The cladding can be, for instance, $Al_2O_3$ (aluminum oxide), SiO and $SiO_2$ (silica). The core 200 delivers light to an NFT 208 that is located within the side cladding layer 204 at the media-facing surface 112. A write pole 210 is located near the NFT 208. A heat sink 212 thermally couples the NFT 208 to the write pole 210. A magnetic coil (not shown) induces a magnetic field through the write pole 210 in response to an applied current. During recording, the NFT 208 forms a hotspot 220 within a recording layer of a moving recording medium 222. The write pole 210 sets a magnetic orientation in the hotspot 220, thereby writing data to the recording medium.

The HAMR writer configuration shown in FIGS. 2 and 3 uses a first-higher transverse electric mode ($TE_{10}$)) light delivery. Light, emitting from the laser diode 106, is coupled into a three-dimensional single mode ($TE_{00}$) channel waveguide 200 by a waveguide input coupler. The excited fundamental mode, $TE_{00}$, is converted into the first higher order mode, $TE_{10}$), with the assisted branch waveguide 302. As seen in FIG. 3, a waveguide taper 200a in the light delivery path is used to connect the waveguide at the end of the mode converter 302 to the waveguide where the NFT 208 is placed. The NFT 208 interacts with the incident light at the $TE_{10}$ waveguide mode, generating local surface plasmon along the circumference of the NFT 208. The charges are funneled into the peg 208c, resulting in lightning effect. For efficient NFT excitation, the $TE_{10}$) waveguide cross-section dimension and shape of the NFT, including the end curvature/shape and NFT height as well as peg dimension are optimized. The embodiment described herein may be used with light delivery systems using other forms of $TE_{00}$-to-$TE_{10}$) mode order converter, such as directional couplers, multi-mode interference (MMI) devices, and waveguide bends. More details of the light delivery system and the near-field transducer are described in the U.S. Pat. No. 9,322,997 (filed on Mar. 25, 2014) and U.S. Pat. No. 9,251,819 (filed on Nov. 12, 2013).

In order to reduce optical feedback with minimal penalty to NFT efficiency, the waveguide core 200 includes a cavity 226 that is centered at the core and near the NFT. While only one cavity 226 is shown in this embodiment, an array of two or more cavities may be used. Each cavity in the array may have the same or different shapes. The illustrated cavity 226 goes through the entire thickness (y-direction) of the core 200, although in some embodiments it may go through just a partial thickness on either downtrack side of the core 200. The cavity has a cross-track width that is less than a corresponding channel width of the core 200 (see channel width $W_c$ in FIG. 3). The size of the cavity 226 is optimized to minimize the optical feedback, which depends on the amount of reflection to be nullified.

The cavity 226 is filled with a dielectric material having a different refractive index than that of the core 200, e.g., having a refractive index of cladding 202, 204, or 206 that is lower than that of the core 200. In some embodiments, the cavity material may have an index higher than that of the core 200. Generally, the cavity 226 is small enough (e.g., a length along the light propagation direction less than about two wavelengths of light) that, while it may be made of a low index dielectric material used in cladding, light will still propagate through the cavity. Thus, unlike a typical cladding, the cavity 226 will not form separate paths within the core 200 through which light is evanescently coupled.

As seen in the detail view of FIG. 5, the cavity 226 has rounded ends 226a-b, one end 226b facing the media-facing surface 112 and the other end 226a facing away from the media-facing surface 112. In other configurations, one or both of the ends 226a-b may be flattened or pointed. The position of the front edge 226a (that faces the incoming light) along the z-direction is determined by the SIM length ($L_{SIM}$, see FIG. 4) where a SIM is used. Generally, it is preferable to have the cavity as close to the media as possible to minimize effect of light wavelength variation (broadband). The cavity 226 is filled with a material that is different from the core, for instance, a cladding material, e.g., the same material used for side cladding 204, top/bottom cladding 202, 206, or some other dielectric material.

Figure 6:
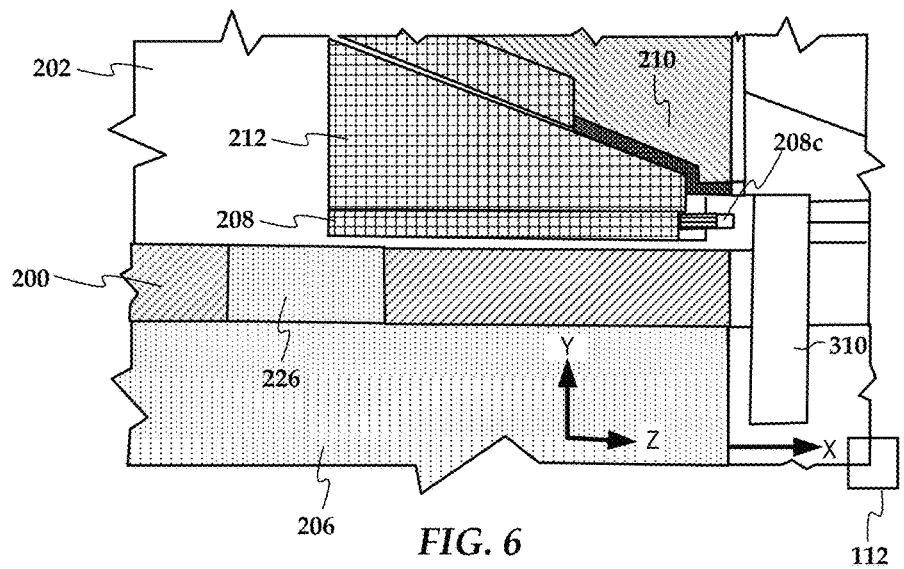
FIG. 6 is a cutaway perspective view of the side shield shown in FIG. 3 and surrounding components.

As seen in FIGS. 3 and 4, a subwavelength reflecting mirror utilizing parabolic solid immersion side shields 310 recycles some of optical energy that is not coupled into the NFT 208. A closer view of one of the shields 310 and surrounding components is seen in the perspective cutaway view of FIG. 6. The shields 310 transfer the optical energy into the longitudinal electric field, boosting the NFT efficiency and therefore, enhancing the thermal gradient. More details of a parabolic side shield is described in U.S. Patent Publication 2017/0249962, filed on Nov. 29, 2016, which is incorporated herein by reference. For better reliability, the material for the side shields 310 may be stitched from two or more different material, for instance, Au, Rh, Ru, and Ir. The side shields 310 may be also recessed slightly from the media-facing surface 112.

Figure 7:
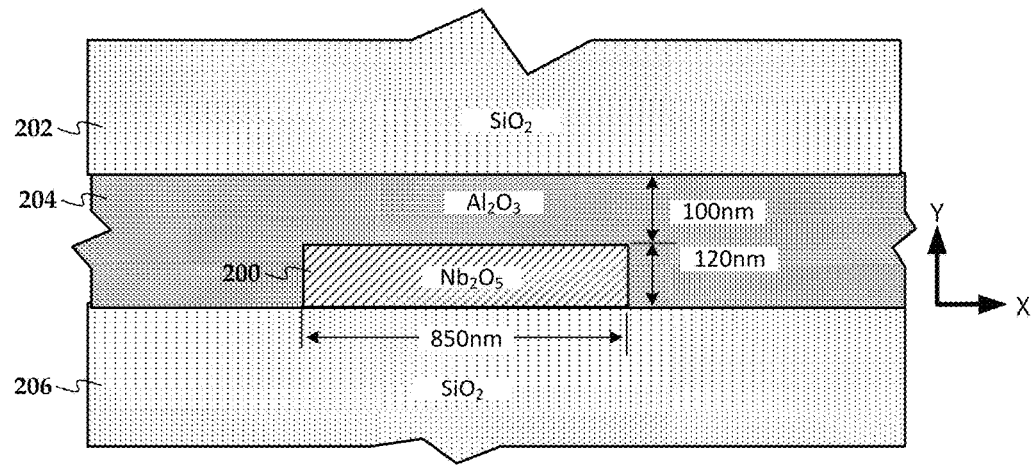
FIG. 7 is a cross-sectional view of the waveguide according to an example embodiment.

To demonstrate the effectiveness of the cavity 226, an example was analyzed with a waveguide made of a 850 nm wide and 120 nm thick niobium oxide ($Nb_2O_5$) core of refractive index n=2.29, surrounded with silica ($SiO_2$, n=1.46) bottom and top cladding layer 206, 202 and with alumina ($Al_2O_3$, n=1.63) side cladding 204, as shown in the cross-section view of FIG. 7. The side cladding 204 is t=220 nm thick. Light wavelength λ=830 nm. The SIM side shield 310 is parabolic, having a paraxial focal length=0.1 μm and bottom opening=335 nm (see FIG. 4) at the media-facing surface 112. The near-field transducer 208 uses gold and has the dimension: radius $R_t$=$R_b$=210 nm, and 620 nm long in the z-direction (see FIG. 4). The peg 208c uses Rh and is 42 nm wide along the cross-track direction, 25 nm thick along the down-track direction, and 20-nm long along the z-direction (the length of protruded part from the large portion of the NFT 208).

Figure 8:
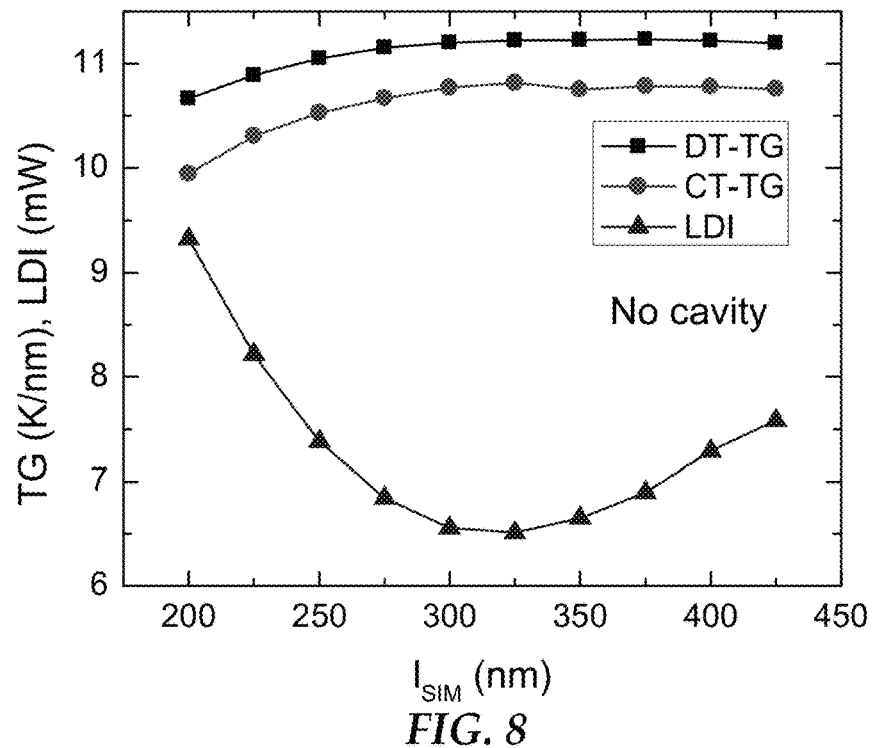
FIGS. 8 and 9 are graphs showing the calculated thermal gradient along the down-track (DT-TG) and cross-track (CT-TG) direction, the required laser power (LDI), and the back reflection/feedback for a baseline configuration according to an example embodiment.
Figure 9:
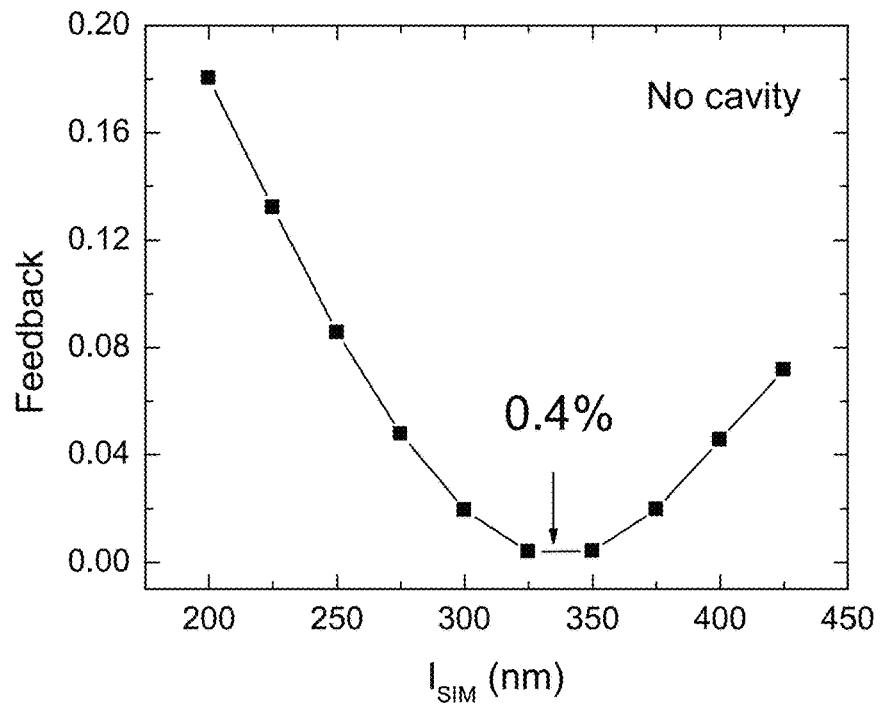

In FIGS. 8 and 9, graphs show the calculated thermal gradient (TG), the laser output power required (LDI), and feedback as a function of SIM side shield length, $L_{SIM}$ for a baseline configuration without the cavity 226 or other added feature in the light path to eliminate feedback. The SIM sidewall thickness is $T_{SIM}$=400 nm (see FIG. 4). In FIG. 8, DT-TG denotes the thermal gradient along down-track and CT-TG along cross-track direction. Both TG and LDI are quoted assuming a 64-nm track width. It is seen that TG, LDI, and feedback are optimal at the SIM side shield length $L_{SIM}$≈330 nm. The minimum feedback is ~0.4%.

Figure 10:
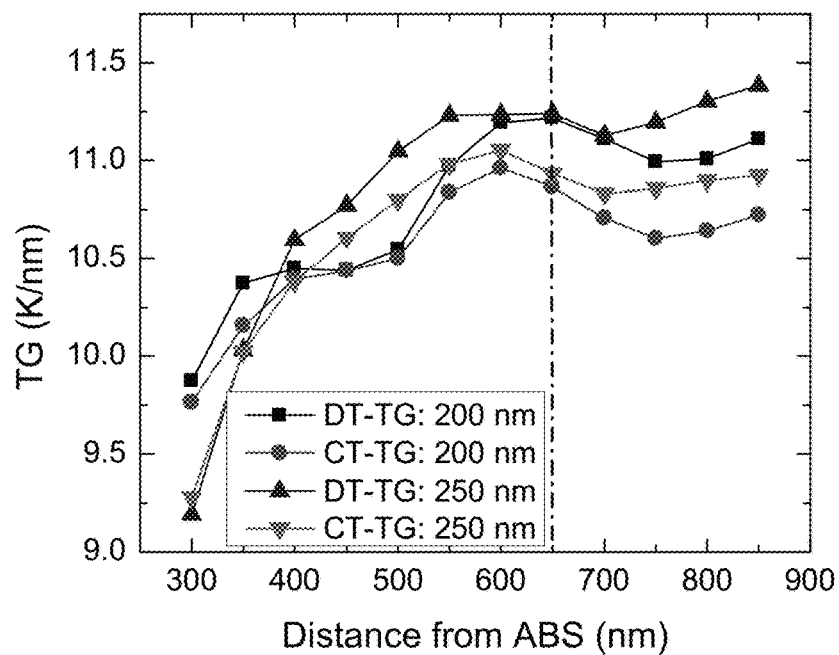
FIGS. 10-12 are graphs showing DT-TG, CT-TG, LDI and feedback for a waveguide with a bottom cladding disk according to an example embodiment.
Figure 11:
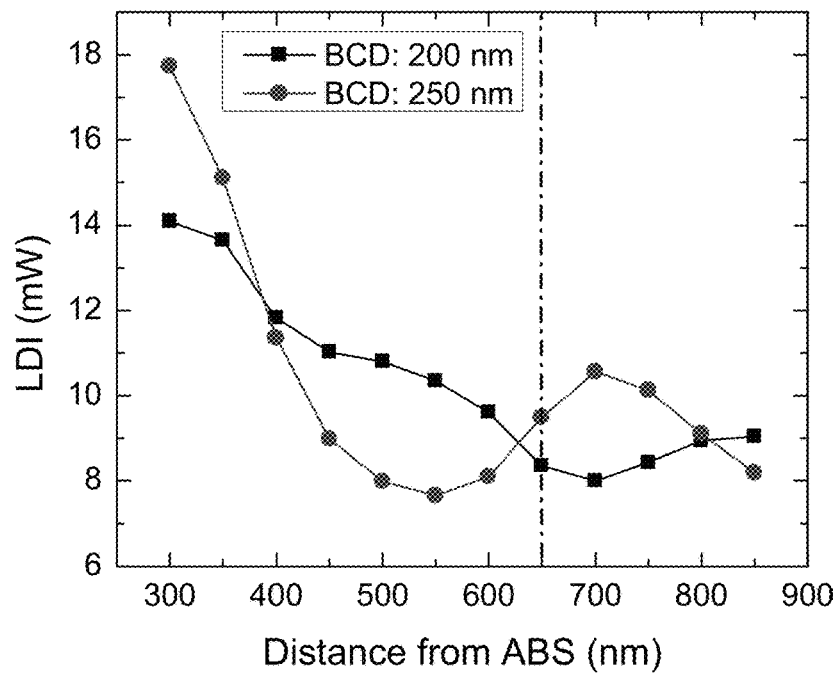
Figure 12:
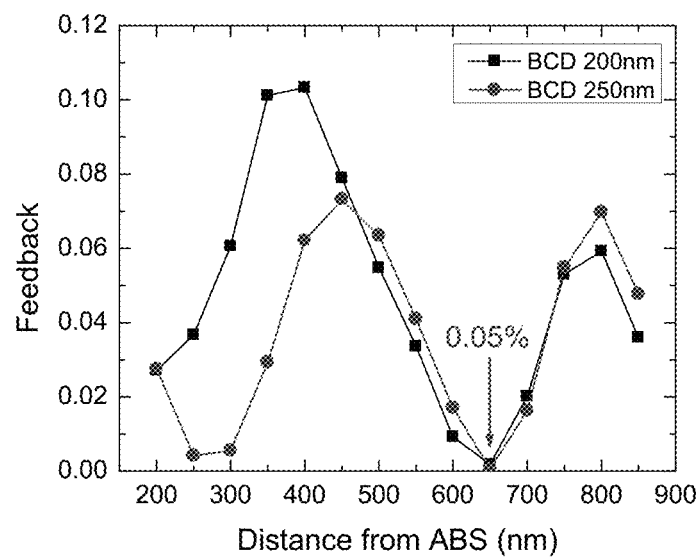

In FIGS. 10-12, graphs show the calculated results with a gold cylinder placed in the bottom cladding, e.g., as indicated by dashed line 230 in FIG. 2 and referred to as a bottom cladding disk (BCD). In this modeling, the SIM side shield is near the position of feedback minimum without the BCD, $L_{SIM}$=350 nm. The BCD reduces the feedback by another 10×, down to 0.05%. At this level of feedback, there will not expect any laser instability caused by the reflection from the recording media/NFT/writer. At the optimal BCD position, the magnitude of TG is similar to the baseline configuration. But this approach may have some drawbacks. For example, the LDI is increased by 30% and the feedback is quite sensitive to the position of the BCD. Also, light absorption in the BCD raises the temperature near the NFT region and media-facing surface 112, resulting in higher broad laser induced writer protrusion (BLIWP) and lower NFT reliability.

Figure 13:
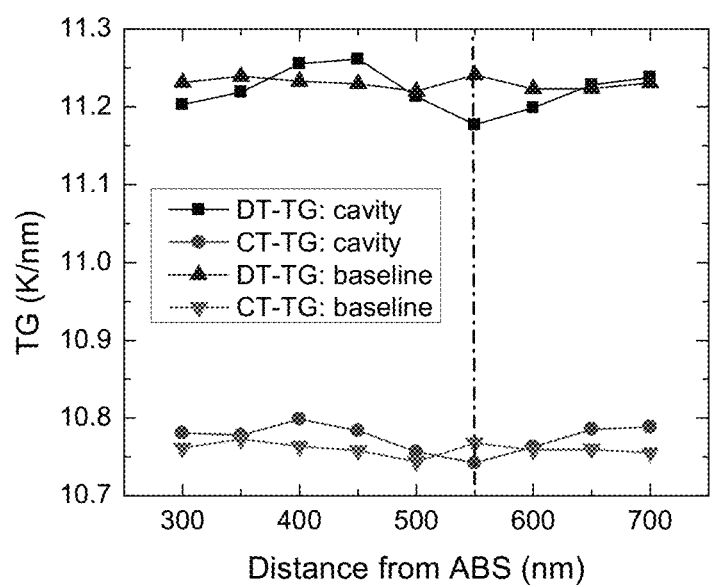
FIGS. 13-15 are graphs showing DT-TG, CT-TG, LDI, and feedback for a waveguide with a cavity according to an example embodiment.
Figure 14:
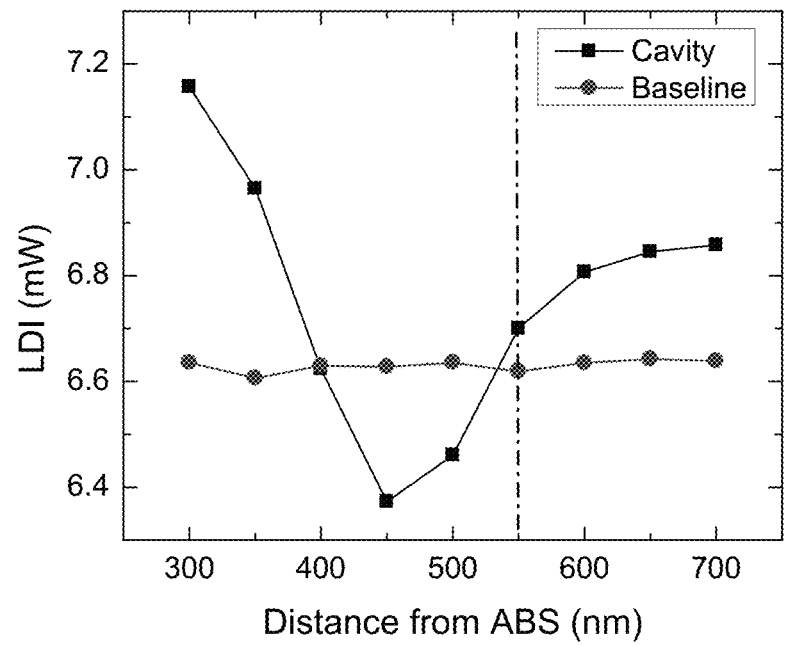
Figure 15:
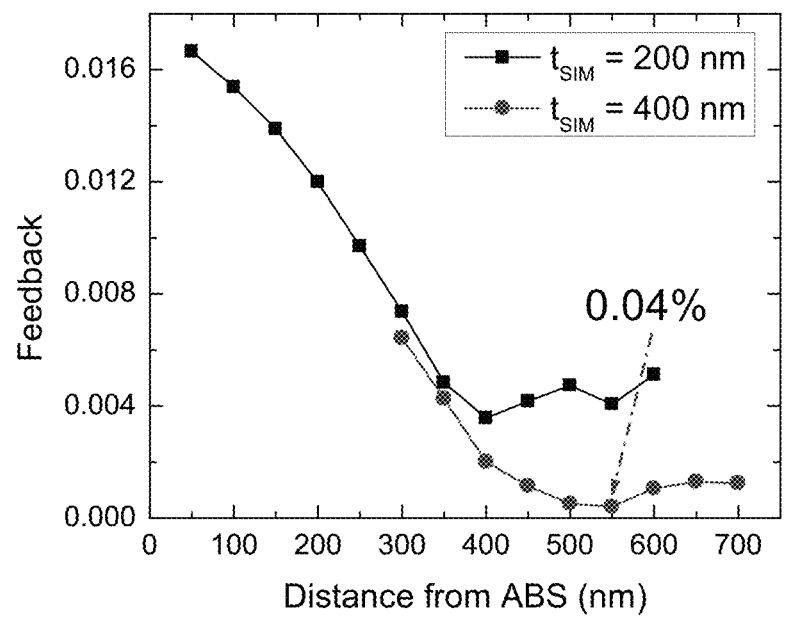

In FIG. 13-15, graphs show the calculated results with a dielectric $Al_2O_3$ (the same material as the side cladding) cavity in the $Nb_2O_5$ core for two SIM sidewall thicknesses ($T_{SIM}$=200 and 400 nm). The cavity is 200 nm in diameter (100 nm radius) and 250 nm long (see length L and radius R in FIG. 5). In this modeling, the SIM side shield is set near the position of feedback minimum without the cavity, $L_{SIM}$=350 nm. At this SIM length and near the cavity position dpos=550 nm (see FIG. 2), the feedback is reduced by 10×, down to 0.04%, which will not cause any laser instability. There is little penalty in the thermal gradient. Comparing to the gold BCD in the bottom cladding, the dielectric cavity has at least three advantages: (1) little penalty in LDI; (2) the feedback is not very sensitive to the cavity position, in particular, at dpos>430 nm; (3) the cavity material is not light absorptive so there is no additional temperature-induced penalties (e.g., broad laser induced writer protrusion or BLIWP, reliability).

Figure 16:
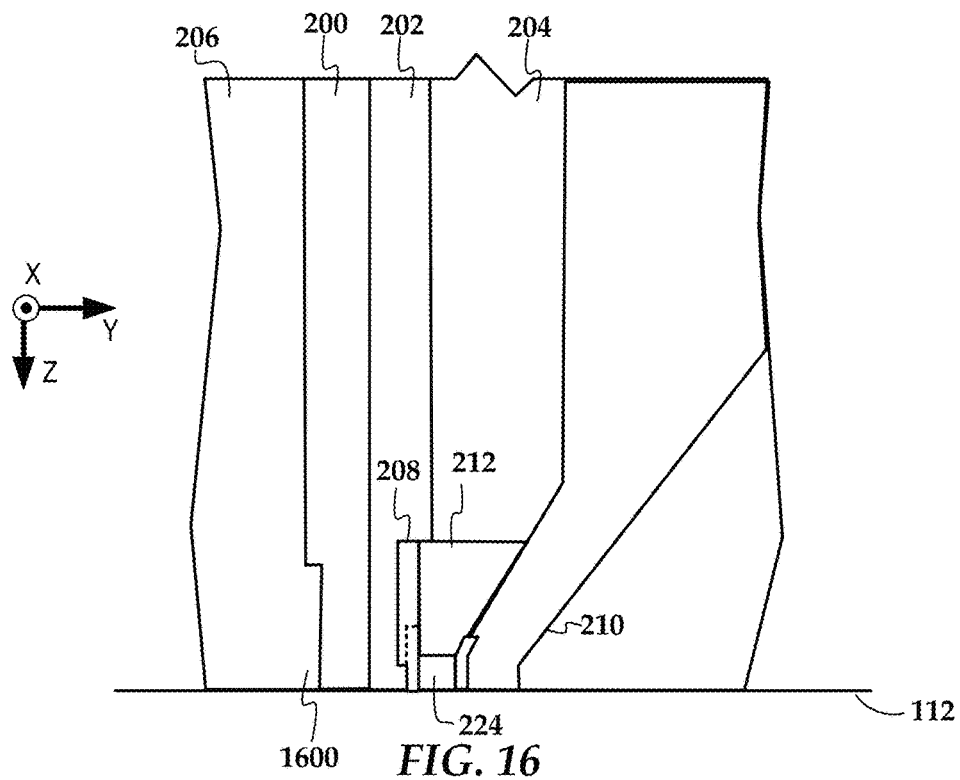
FIGS. 16 and 17 are a cross-sectional views of a slider along a down-track plane according to according to other example embodiments.
Figure 17:
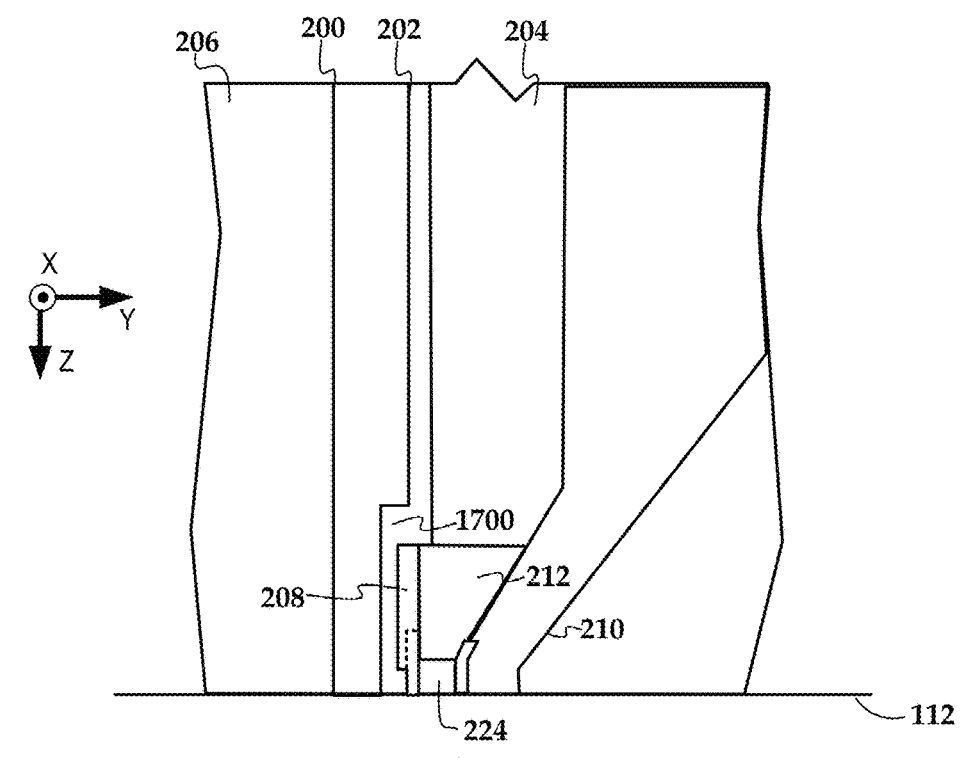
Figure 18:
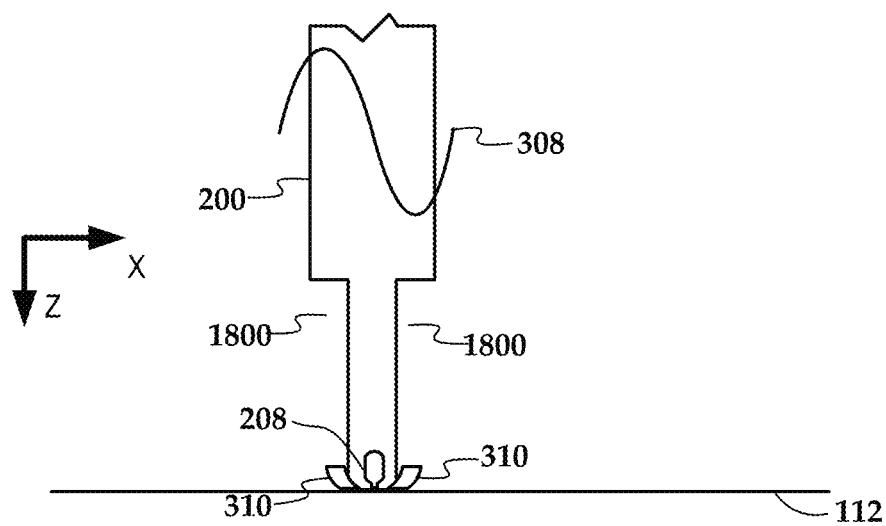
FIG. 18 is a top view of a waveguide according to another example embodiment.
Figure 19:
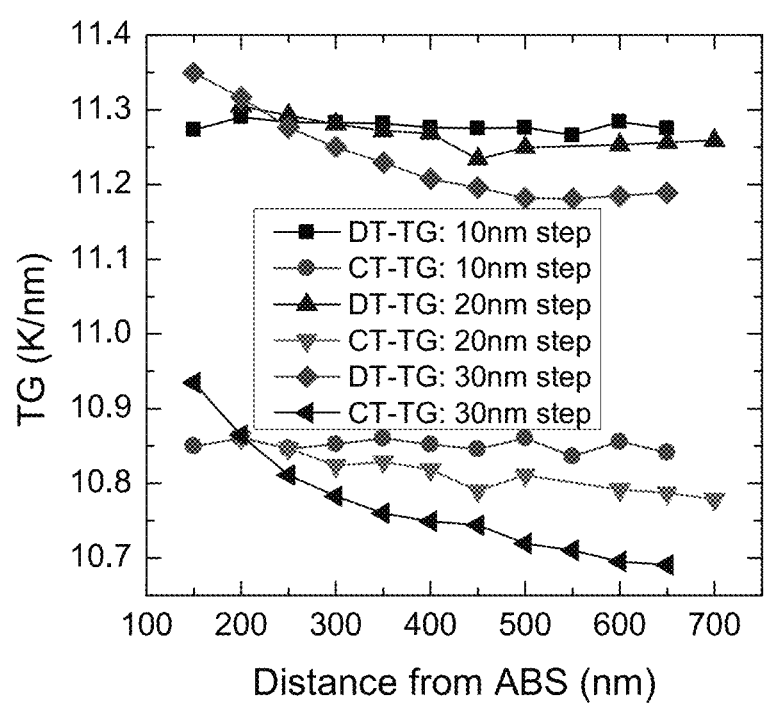
FIGS. 19-21 are a graphs showing DT-TG, CT-TG, LDI, and feedback for the slider configuration shown in FIG. 16.
Figure 20:
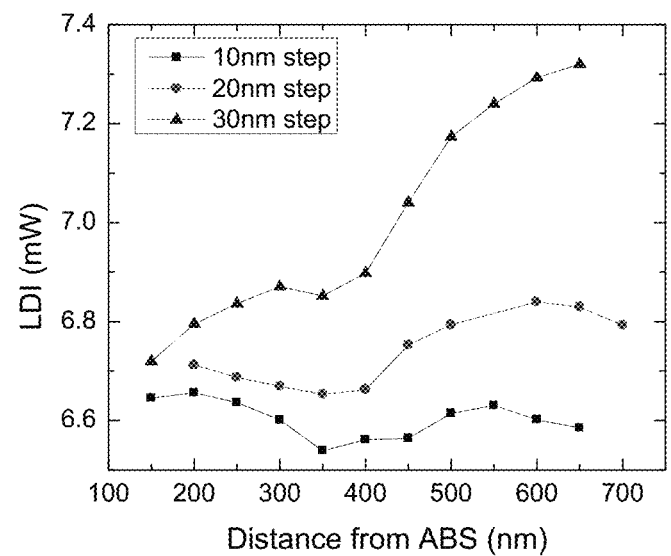
Figure 21:
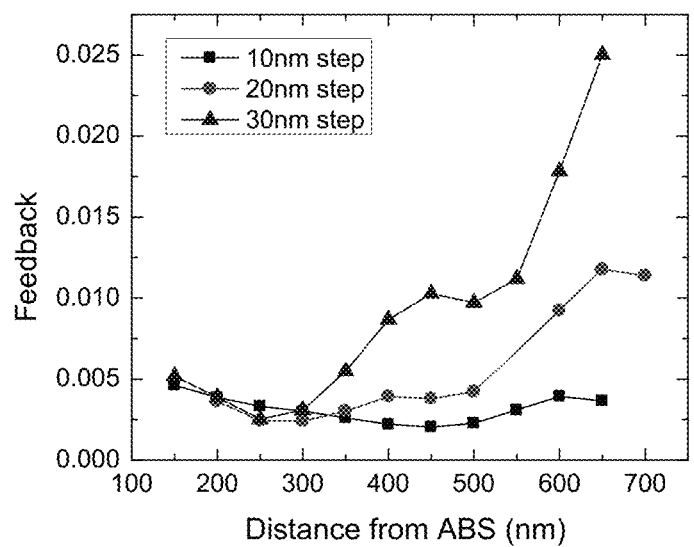

Other techniques may be used to eliminate the feedback instead of or in addition to a cavity. For example, the core 200 may include a step in the down-track direction as shown by steps 1600 and 1700 in FIG. 17. Another example is to put steps in the core in the cross-track direction, as shown by steps 1800 in FIG. 18. The graphs in FIGS. 19-21 show modeling of a configuration with step 1600 at the interface between the core 200 and bottom cladding 206 along down track direction as shown in FIG. 16. This step 1600 reduces the core thickness underneath the NFT 208, which could reduce thermal background and therefore, improve TG if optimized for this purpose. If optimized for feedback, the gain in LDI or TG will not show up. The minimum feedback is about 0.2%, only a 2× reduction, which is not as great a reduction under these conditions as can be obtained using a cladding-filled cavity in the core.

Figure 22:
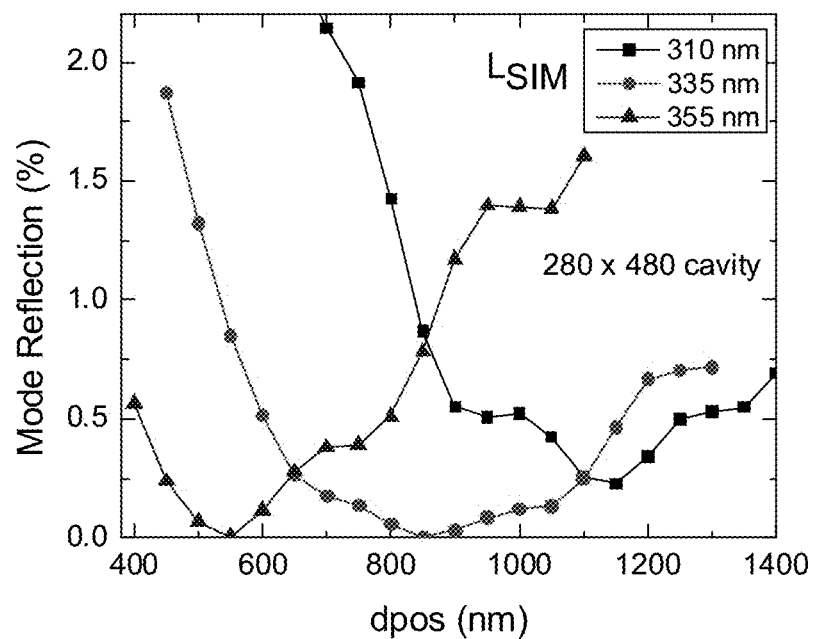
FIGS. 22 and 23 are graphs showing results of modeling mode reflection/feedback versus cavity position for different example embodiments.
Figure 23:
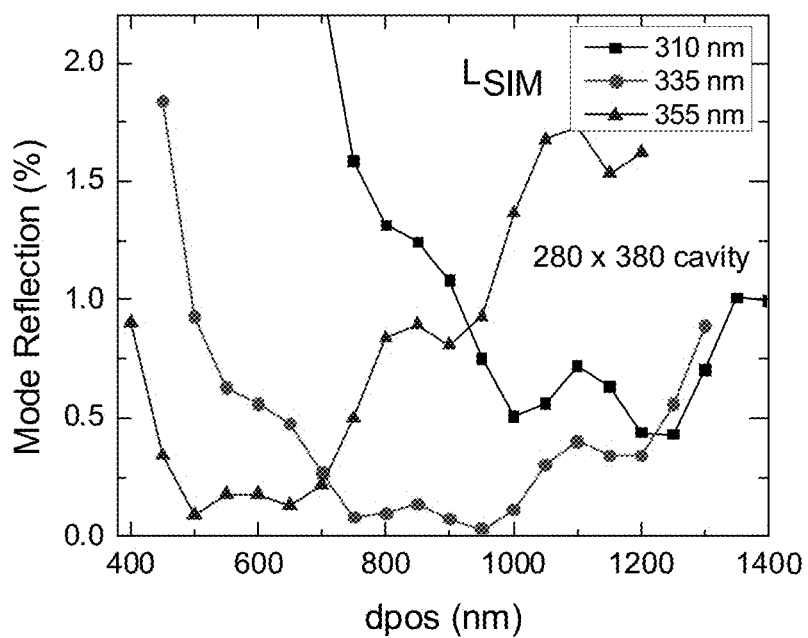

As previously noted, the z-location of the cavity 226 within the waveguide (e.g., as specified by dpos in FIG. 1) is dependent on the z-dimension (e.g., $L_{SIM}$ in FIG. 4) of the reflecting mirror 310. In FIGS. 22 and 23, graphs show results of modeling mode reflection versus dpos for different values of $L_{SIM}$. The results in FIG. 22 are for a 280 nm×480 nm (crosstrack-width×z-length) cavity and the results in FIG. 23 are for a 280 nm× 380 nm cavity. This modeling is carried out on a fabricated SIM with corner rounding. Without a cavity, the minimal mode reflection is 1.5% at $L_{SIM}$=335 nm.

Figure 24:
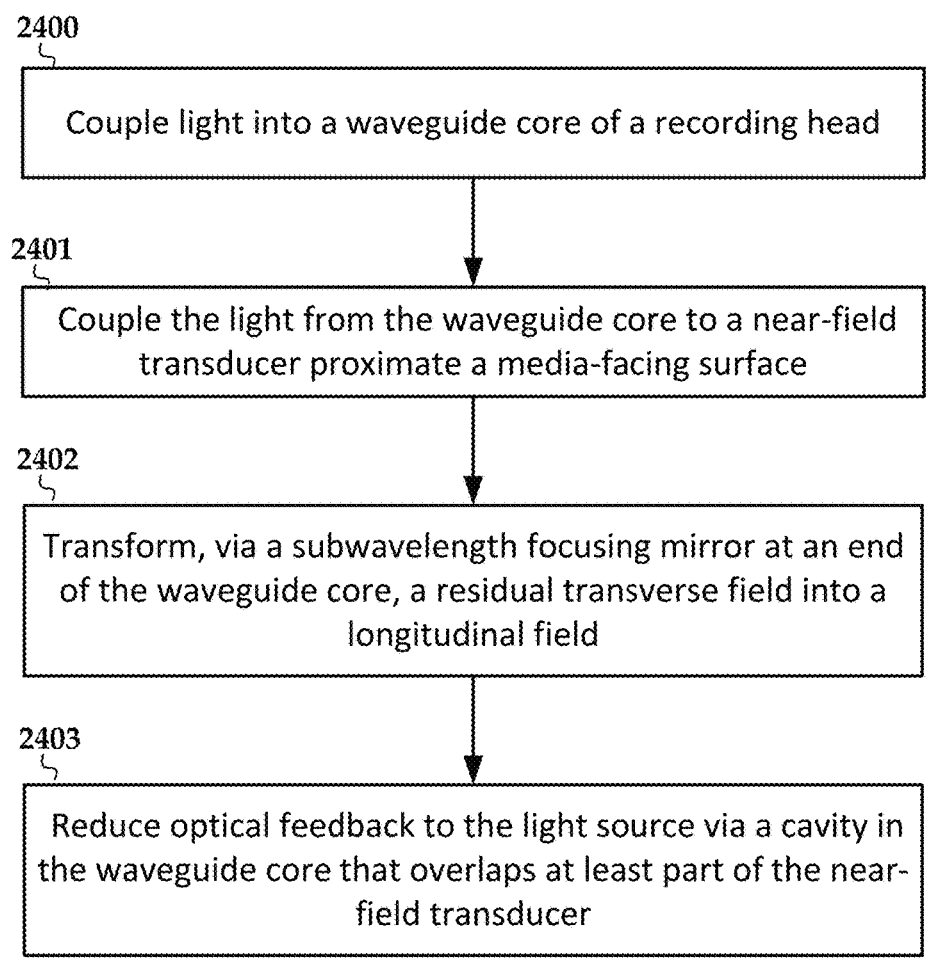
FIG. 24 is a flowchart of a method according to an example embodiment.

In FIG. 24, a flowchart shows a method according to an example embodiment. The method involves coupling 2400 light into a waveguide core of a recording head. The light is coupled 2401 from the waveguide core to a near-field transducer proximate a media-facing surface of the recording head. The waveguide core overlaps the near-field transducer in a downtrack direction. The coupling of the light to the near-field transducer generates a residual transverse field.

A subwavelength reflecting mirror at an end of the waveguide core proximate the media-facing surface transforms 2402 the residual transverse field into a longitudinal field. Optical feedback to the light source is reduced 2403 via a cavity in the waveguide core near the near-field transducer. The cavity is filled with a material different from the core, in particular, a cladding material. The size of the cavity is dependent on the reflection to be nullified and its position along light propagation direction is related to the SIM length.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A recording head comprising:
a near-field transducer proximate a media-facing surface of the recording head; and
a waveguide core that overlaps and delivers light from a light source to the near-field transducer along a light propagation direction, the waveguide core comprising a dielectric cavity proximate the near-field transducer, the near-field transducer being located outside of the waveguide core within a cladding material that is located on a side of the waveguide core, the cladding material having a lower refractive index than that of the waveguide core, the dielectric cavity comprising a length along the light propagation direction such that light will propagate through the dielectric cavity, the dielectric cavity filled with the cladding material and reducing optical feedback to the light source.

2. The recording head of claim 1, further comprising a subwavelength reflecting mirror at an end of the waveguide core proximate the media-facing surface, the subwavelength reflecting mirror transforming residual transverse fields into a longitudinal field.

3. The recording head of claim 2, wherein the subwavelength reflecting mirror comprises two side shields located on both crosstrack sides of the near-field transducer, an opening between the side shields being less than 200 nm, the opening reducing thermal background to increase thermal gradient in a hotspot in a recording medium.

4. The recording head of claim 1, wherein the dielectric cavity overlaps a top edge of the near-field transducer, the top edge facing away from the media-facing surface.

5. The recording head of claim 1, wherein the near-field transducer comprises an enlarged portion and a peg extending from the enlarged portion to the media-facing surface, the cavity near the enlarged portion that faces away from the media-facing surface.

6. The recording head of claim 1, wherein the cavity comprises a cross-track width proximate the near field transducer less than a channel width of the waveguide core.

7. The recording head of claim 1, further comprising a mode converter between the light source and the near-field transducer, the mode converter converting the light from a fundamental mode to a higher-order mode.

8. The recording head of claim 7, wherein mode converter comprises a branch waveguide.

9. The recording head of claim 1, wherein the cavity extends through a partial thickness of the waveguide core.

10. A method comprising:
coupling light into a waveguide core of a recording head;
coupling the light from the waveguide core to a near-field transducer proximate a media-facing surface of the recording head, the waveguide core overlapping the near-field transducer in a downtrack direction, the near-field transducer being located outside from the waveguide core within a cladding material that is located on a side of the waveguide core, the cladding material having a lower refractive index than that of the waveguide core; and
reducing optical feedback to the light source via a dielectric cavity in the waveguide core proximate the near-field transducer, the cavity comprising a length along the light propagation direction such that light will propagate through the dielectric cavity, the dielectric cavity filled with the cladding material.

11. The method of claim 10, wherein the coupling of the light to the near-field transducer generates a residual transverse field, the method further comprising transforming, via subwavelength reflecting mirror at an end of the waveguide core, the residual transverse field into a longitudinal field.

12. The method of claim 11, wherein the subwavelength reflecting mirror comprises two side shields located on both crosstrack sides of the near-field transducer, an opening between the side shields being less than 200 nm, the opening reducing thermal background to increase thermal gradient in a hotspot in a recording medium.

13. The method of claim 11, wherein the dielectric cavity overlaps a top edge of the near-field transducer, the top edge facing away from the media-facing surface, a position of the dielectric cavity depending on a length of the reflecting mirror.

14. The method of claim 10, wherein the near-field transducer comprises an enlarged portion and a peg extending from the enlarged portion to the media-facing surface, the cavity near or overlapping an edge of the enlarged portion that faces away from the media-facing surface.

15. The method of claim 10, wherein the cavity comprises a cross-track width proximate the near field transducer less than a channel width of the waveguide core.

16. The method of claim 10, further comprising converting the light from a fundamental mode to a higher-order mode via a mode converter between the light source and the near-field transducer.

17. A recording head comprising:
a light source on a top surface of the recording head;
a waveguide delivering light from the light source to a media-facing surface of the recording head, the waveguide comprising:
a bottom cladding layer;
a top cladding layer; and
a core between the top and bottom cladding layers, the core comprising a cavity filled with a cladding material near the media-facing surface, the cavity comprising a length along the light propagation direction such that light will propagate through the dielectric cavity, the cavity further comprising a cross-track width proximate the near field transducer less than a channel width of the waveguide core;
a near-field transducer offset from the core in a downtrack direction, the near-field transducer comprising an enlarged portion and a peg extending from the enlarged portion to the media-facing surface, the enlarged portion near or partially overlapping the rounded cavity of the core; and two reflecting side shields at the media-facing surface facing first and second crosstrack sides of the near-field transducer, the reflecting side shields transforming residual transverse fields into a longitudinal field, an opening between the side shields being less than 200 nm, the opening reducing thermal background to increase thermal gradient in a hotspot in a recording medium.

18. The recording head of claim 17, wherein the cavity reduces optical feedback to the light source.

19. The recording head of claim 17, wherein the waveguide comprising a branch waveguide that converts the light from a fundamental mode to a higher-order mode, the light being coupled into the near-field transducer at the higher-order mode.

20. The recording head of claim 1, wherein the dielectric cavity comprises a first rounded end facing the media-facing surface and a second rounded surface facing away from the media-facing surface.

* * * * *